Nov. 2, 1937.    B. COOK ET AL    2,098,134
BEARING CUP EXTRACTING TOOL
Filed Nov. 13, 1936    2 Sheets—Sheet 1
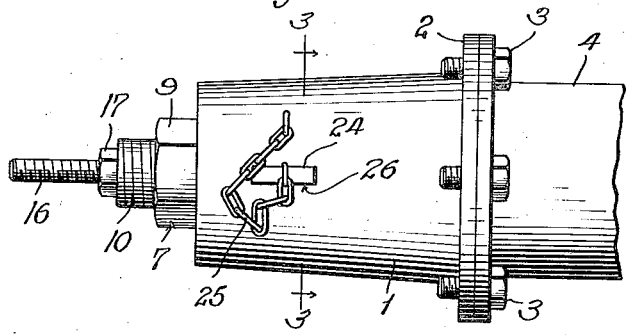
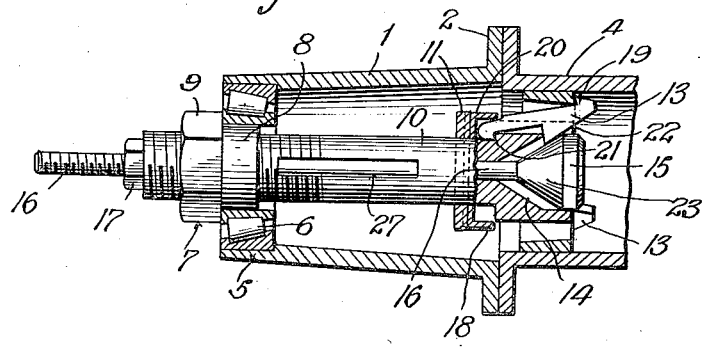
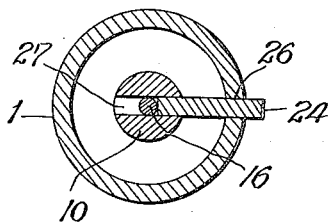
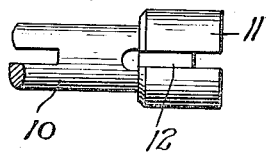
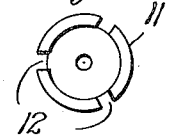
Bennie Cook
Edward C. Pfeffer
INVENTORS
BY Victor J. Evans & Co.
ATTORNEYS

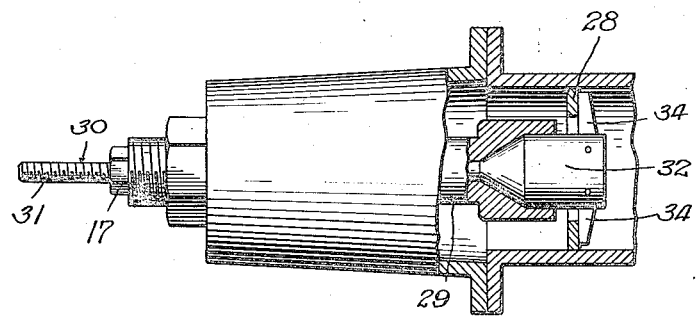
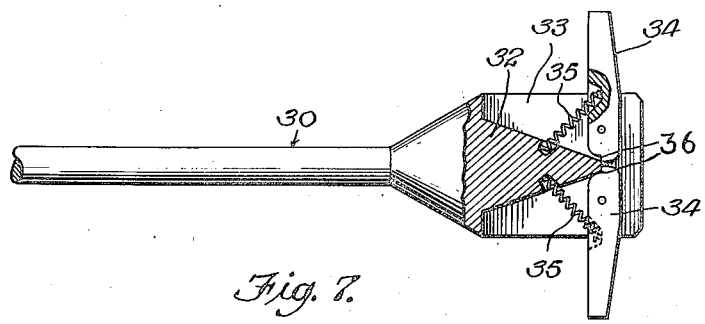
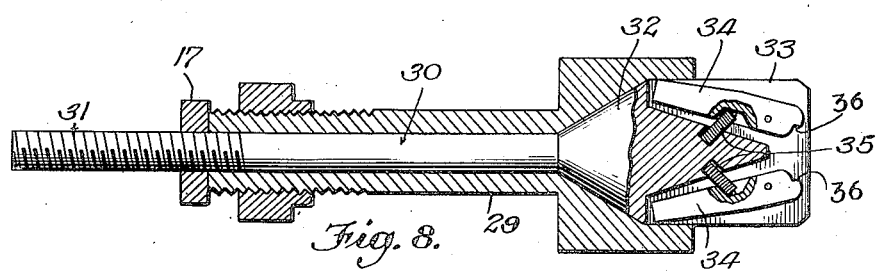
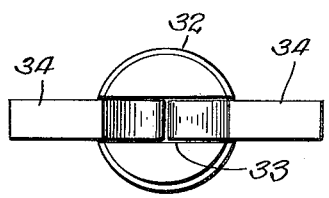

UNITED STATES PATENT OFFICE 2,098,134

BEARING CUP EXTRACTING TOOL

Bennie Cook, Oklahoma City, Okla., and Edward C. Pfeffer, Corpus Christi, Tex.

Application November 13, 1936, Serial No. 110,754

1 Claim. (Cl. 29—88.2)

This invention relates to extracting tools especially adapted for removing bearing cups and grease retainers from rear axle housings of motor vehicles and also may be employed for removing axles from axle housings, and has for the primary object the provision of a device of this character which provides a durable, compact and complete tool for the above-named purposes and which will quickly, easily and safely remove parts from the axle housing without damage thereto.

With these and other objects in view, this invention consists in certain novel features of construction, combination and arrangement of parts to be hereinafter more fully described and claimed.

For a complete understanding of our invention, reference is to be had to the following description and accompanying drawings, in which Figure 1 is a side elevation illustrating an extracting tool constructed in accordance with our invention and showing the same adapted to a portion of an axle housing.

Figure 2 is a vertical sectional view illustrating the same.

Figure 3 is a transverse sectional view taken on the line 3—3 of Figure 1.

Figure 4 is a fragmentary plan view illustrating a dog holding member of this invention.

Figure 5 is an end elevation illustrating the same.

Figure 6 is a side elevaton, partly in section, showing the invention arranged for the removal or extraction of a grease retainer.

Figure 7 is a side elevation partly in section showing the dog carrying member which is employed when extracting a grease retainer.

Figure 8 is a vertical sectional view showing the dogs held collapsed prior to being brought in engagement with the grease retainer.

Figure 9 is an end view showing the dogs in spread position of the member employed for extracting the grease retainer.

Referring in detail to the drawings, the numeral 1 indicates a substantially tubular shaped housing, one end of which is provided with a flange 2 apertured to receive stud bolts or like fasteners 3 for detachably securing the housing 1 to the end of an axle housing 4 of a motor vehicle. The housing 1 when connected to the axle housing as described will be maintained in perfect alignment with said axle housing and against movement relative thereto. The housing 1 is internally grooved adjacent its other end to form a seat 5 for an anti-friction bearing 6. The anti-friction bearing rotatably supports a nut 7 which includes a cylindrical portion 8 and wrench engaging faces 9. The cylindrical portion 8 fits in the anti-friction bearing 6.

A dog carrying member 10 of hollow formation has threaded engagement with the nut 7 and extends into the housing 1. The end of the member 10 within the housing is enlarged to form a head 11 provided with grooves 12 to receive the dogs 13. Also the head has a conical shaped bore 14 to receive a dog spreading element 15. The dog spreading element 15 is formed on a rod 16 which extends through the dog carrying member 10 and has a nut 17 threaded thereon. A cup-shaped element 18 is carried by the member 10 adjacent the head for aiding in retaining the dog in the grooves 12 for a limited movement inwardly and outwardly of said grooves.

Each dog has a hook 19 at one end and a hook 20 at the opposite end. The hooks 19 and 20 extend in opposite directions. The hook 19 engages the work to be extracted from the axle housing while the hook 20 engages in a recess 21 formed in the member 10 and communicating with the grooves 12. The recess 21 and the cup-shaped element 18 cooperate in pivotally mounting the dogs to the head 11. The dogs have formed thereon beveled shoulders 22 adapted to ride against a conical-shaped portion 23 of the dog spreading member 15.

The housing 1 has connected thereto a key 24 by a flexible element 25. The housing has a slot 26 to permit the key to extend into the housing for entering a slot 27 formed in the member 10. The slot 26 is approximately the width of the key's thickness while the slot 27 in length is several times greater than the width of the key. The key positioned in the slots 26 and 27 secures the member 10 to the housing 1 against rotation relative thereto but will permit the member 10 to have sliding or endwise movement relative to the housing.

In operation, after the application of the housing 1 to the axle housing as heretofore described and the dogs 13 are positioned so the hooked ends 19 engage the inner edge of the bearing cup, the nut 7 is rotated in a proper direction causing an endwise movement of the member 10. This endwise movement of the member 10 draws the bearing cup outwardly of the axle housing into the housing 1 without mutilation or damage thereto. It is to be understood that the dogs are adjusted in engagement with the bearing cup by rotating the nut 17 in the proper direction.

To adapt this invention for the purpose of extracting a grease retainer 28 from the axle housing, the dogs 13 and spreading element 15 are not used and members 29 and 30 employed in lieu thereof. The member 29 is similarly constructed to the member 10 without the grooves or dogs and the bore thereof has a conical-shaped portion and a cylindrical-shaped portion, as clearly shown in Figure 6. The member 30 consists of a screw threaded rod 31 to receive the nut 17 and extends through the member 10 and has a head 32 grooved, as shown at 33. Dogs 34 are pivotally mounted to the head 32 within the grooves and are engaged by expansion springs 35 acting to urge said dogs outwardly of the grooves. The pivoted ends of the dogs have shoulders 36 to abut the head 32 when the dogs are in spread position.

In operation, the dogs 34 are held in the grooves 33 by extending into the cylindrical portion of the head of the member 10. The device is then inserted in the axle housing with the housing 1 bolted to the latter until the dogs are past the lubricant retainer 28, the latter then assuming the position shown in Figure 6, having engagement with the inner face of the grease retainer. The nut 9 is then brought in engagement with the bearing 6 and the nut 17 rotated in a proper direction imparting endwise movement to the member 30 and thereby drawing the grease retainer out of the axle housing into the housing 1.

Having described the invention, what is claimed is:

An extractor comprising a housing, a bearing carried by said housing, a hollow dog carrying member mounted in said bearing, a nut threaded to said dog carrying member and engaging the bearing, a rod extending through the dog carrying member, a head formed on said rod, a nut threaded to said rod and engaging the dog carrying member, and spring pressed dogs pivoted to said head and held collapsed by the dog carrying member until said member is freed thereof permitting said dogs to expand to engage with a grease retainer.

BENNIE COOK.
EDWARD C. PFEFFER.